US012698869B2

(12) United States Patent
Al-Sharif et al.

(10) Patent No.: US 12,698,869 B2
(45) Date of Patent: Aug. 4, 2026

(54) IN-PIPE LOCALIZATION OF TOOLS USING SIGNAL PROFILES

(71) Applicant: Saudi Arabian Oil Company, Dhahran (SA)

(72) Inventors: Mohammed H. Al-Sharif, Thuwal (SA); Ahmed Aljarro, Thuwal (SA); Khalid S. Ghamdi, Dhahran (SA); Salah A. Zahrani, Dhahran (SA); Mohammed T. Abdulmohsin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 277 days.

(21) Appl. No.: 18/502,869

(22) Filed: Nov. 6, 2023

(65) Prior Publication Data

US 2025/0146627 A1 May 8, 2025

(51) Int. Cl.

| | |
|---|---|
| *F17D 5/06* | (2006.01) |
| *F16L 55/38* | (2006.01) |
| *F16L 55/48* | (2006.01) |
| *F16L 101/30* | (2006.01) |
| *G01M 3/00* | (2006.01) |

(52) U.S. Cl.
CPC ............... *F17D 5/06* (2013.01); *F16L 55/38* (2013.01); *F16L 55/48* (2013.01); *G01M 3/005* (2013.01); *F16L 2101/30* (2013.01)

(58) Field of Classification Search
CPC ... F17D 5/06; F16L 55/38; F16L 55/48; F16L 2101/30; G01M 3/005
See application file for complete search history.

(56) References Cited

U.S. PATENT DOCUMENTS

| | | |
|---|---|---|
| 4,747,317 A | 5/1988 | Lara |
| 5,115,196 A | 5/1992 | Low et al. |
| 5,769,164 A | 6/1998 | Archer |
| (Continued) | | |

FOREIGN PATENT DOCUMENTS

| | | |
|---|---|---|
| CN | 114352845 A | 4/2022 |
| EP | 0272073 A2 | 6/1988 |
| (Continued) | | |

OTHER PUBLICATIONS

Aghdam et al., "Localizing Pipe Inspection Robot Using Visual Odometry," 2014 IEEE International Conference on Control System, Computing and Engineering (ICCSCE 2014), Nov. 28-30, 2014, 6 pages.

(Continued)

*Primary Examiner* — Laura Martin
*Assistant Examiner* — Anthony W Megna Fuentes
(74) *Attorney, Agent, or Firm* — Fish & Richardson P.C.

(57) ABSTRACT

Systems and methods for estimating location of features in a pipeline be based on acquiring measurements of electromagnetic signals from the plurality of electromagnetic sensors; detecting welds in walls of the pipeline based on the measurements; estimating an instantaneous velocity of the device as the device passes welds based at least in part on characteristics of the measurements of the signals from the plurality of electromagnetic sensors; and estimating position of the device in the pipeline based at least in part on the estimates of the instantaneous velocity of the device over time.

18 Claims, 8 Drawing Sheets

(56) References Cited

U.S. PATENT DOCUMENTS

| | | | |
|---|---|---|---|
| 6,023,986 | A | 2/2000 | Smith |
| 6,553,322 | B1 | 4/2003 | Ignagni |
| 6,768,959 | B2 | 7/2004 | Ignagni |
| 7,841,249 | B2 | 11/2010 | Tormoen |
| 8,689,653 | B2 | 4/2014 | Cogen et al. |
| 8,973,444 | B2 | 3/2015 | Hill et al. |
| 10,132,823 | B2 | 11/2018 | Giunta et al. |
| 10,851,947 | B2 | 12/2020 | Gong et al. |
| 10,931,871 | B2 | 2/2021 | Li et al. |
| 11,519,546 | B2 | 12/2022 | Louise-Alexandrine Baron et al. |
| 2004/0173116 | A1 | 9/2004 | Ghorbel et al. |
| 2007/0062274 | A1 | 3/2007 | Chikenji et al. |
| 2008/0041173 | A1* | 2/2008 | Tormoen ................. F16L 55/48 73/866.5 |
| 2008/0250869 | A1 | 10/2008 | Breed et al. |
| 2009/0090518 | A1 | 4/2009 | Coon et al. |
| 2009/0128141 | A1 | 5/2009 | Hopmann et al. |
| 2011/0114119 | A1 | 5/2011 | Yang |
| 2011/0199228 | A1 | 8/2011 | Roddy et al. |
| 2014/0345878 | A1 | 11/2014 | Murphree et al. |
| 2016/0362937 | A1 | 12/2016 | Dyer et al. |
| 2017/0138524 | A1 | 5/2017 | El-Sheimy |
| 2017/0226849 | A1 | 8/2017 | Fan et al. |
| 2018/0094519 | A1 | 4/2018 | Stephens et al. |
| 2019/0339230 | A1 | 11/2019 | Khalaj Amineh et al. |
| 2019/0346333 | A1 | 11/2019 | Youcef-Toumi et al. |
| 2020/0309986 | A1 | 10/2020 | Donderici |
| 2020/0400419 | A1 | 12/2020 | Li et al. |
| 2021/0174486 | A1 | 6/2021 | Chowhan |
| 2021/0207758 | A1* | 7/2021 | Poe ........................ G01N 27/87 |
| 2022/0136637 | A1 | 5/2022 | Kwan |
| 2022/0178244 | A1 | 6/2022 | Fouda et al. |
| 2022/0268392 | A1 | 8/2022 | Moreau et al. |
| 2023/0054659 | A1 | 2/2023 | Danilov et al. |
| 2023/0175916 | A1 | 6/2023 | Fouda et al. |
| 2023/0176015 | A1 | 6/2023 | Fadhel et al. |
| 2023/0204146 | A1 | 6/2023 | Laursen |

FOREIGN PATENT DOCUMENTS

| | | |
|---|---|---|
| GB | 2226633 | 7/1990 |
| KR | 20220105076 | 7/2022 |
| RU | 2697008 | 8/2019 |
| RU | 2722636 | 6/2020 |
| WO | WO 1999032902 A2 | 7/1999 |
| WO | WO 2017153896 | 9/2017 |

OTHER PUBLICATIONS

Al-Masri et al., "Inertial Navigation System of Pipeline Inspection Gauge," IEEE Transactions on Control Systems Technology, Nov. 18, 2018, 28(2):609-616, 8 pages.

Buzi et al., "Sensor Ball: An Autonomous Untethered Logging Platform," Presented at the Offshore Technology Conference, Houston, Texas, May 4, 2020, 10 pages.

Ékes et al., "Pipe Penetrating Radar Inspection of Large Diameter Underground Pipes," Proceedings of the 15th International Conference on Ground Penetrating Radar, 2014, 4 pages.

Gomez et al., "An Ultrasonic Profiling Method for Sewer Inspection," IEEE International Conference on Robotics and Automation, Apr. 2004, 5:4858-4863, 6 pages.

International Search Report and Written Opinion in International Appln. No. PCT/US2024/018613, mailed on May 3, 2024, 13 pages.

Kazeminasab et al., "Localization, Mapping, Navigation, and Inspection Methods in In-Pipe Robots: A Review," IEEE Access, Nov. 23, 2021, 9:162035-58, 24 pages.

Liu et al., "The Use of Laser Range Finder on a Robotic Platform for Pipe Inspection," Mechanical Systems and Signal Processing, Aug. 2012, 31:246-257, 12 pages.

Murtra et al., "IMU and Cable Encoder Data Fusion for In-Pipe Mobile Robot Localization," Presented at the IEEE Conference on Technologies for Practical Robot Applications (TePRA), Woburn, Massachusetts, Apr. 22-23, 2013, 6 pages.

Nassiraei et al., "A New Approach to the Sewer Pipe Inspection: Fully Autonomous Mobile Robot "Kantaro"," IECON 2006—32nd Annual Conference on IEEE Industrial Electronics, Nov. 6-10, 2006, 4088-4093, 6 pages.

Ooi et al., "EM-Based 2D Corrosion Azimuthal Imaging using Physics Informed Machine Learning PIML," Prepared for presentation at the SPE Offshore Europe Conference & Exhibition, Sep. 7-10, 2021, 15 pages.

Santana et al., "Estimation of Trajectories of Pipeline PIGs Using Inertial Measurements and Non Linear Sensor Fusion," Presented at the 9th Annual IEEE/IAS International Conference on Industry Applications (INDUSCON), Sao Paulo, Brazil, Nov. 8-10, 2010, 6 pages.

Strapdown Inertial Navigation Technology, 2nd Edition, 2004, Chapter 3, 41 pages.

ucarecdn.com [online], "Specifications and requirements for in-line inspection of pipelines," Nov. 3, 2016, retrieved on Mar. 6, 2024, URL <https://ucarecdn.com/58371ddd-72ea-4cf4-9422-4c9fbfd5cac1/01_2016_Version.pdf>, 57 pages.

U.S. Appl. No. 18/449,295, Aljarro et al., Smart Body For Contactless Detection of Defects Using Artificial Intelligence, filed Aug. 14, 2023, 45 pages.

U.S. Appl. No. 18/185,068, Al-Sharif et al., In-pipe Localization of Pipeline Inspection Gadgets, filed Mar. 6, 2023, 31 pages.

U.S. Appl. No. 18/502,904, Al-Sharif et al., In-pipe Localization of Tools Using Time Between Signals, filed Nov. 6, 2023, 44 pages.

U.S. Appl. No. 18/449,327, Aljarro et al., Traceable and Disintegrable Artificial Intelligence Powered Sensing System and Method for The Detection of Defects in Pipelines, filed Aug. 14, 2023, 48 pages.

Wang et al., "Navigation of a Mobile Robot in a Dynamic Environment Using a Point Cloud Map," Artificial Life and Robotics, Jul. 26, 2020, 26:10-20, 11 pages.

Wu et al., "A Practical Minimalism Approach to In-pipe Robot Localization," 2019 American Control Conference (ACC), Jul. 10-12, 2019, 8 pages.

Wu, "Low-Cost Soft Sensors and Robots for Leak Detection in Operating Water Pipes," Thesis for the degree of Doctor of Philosophy in Mechanical Engineering, Massachusetts Institute of Technology, Department of Mechanical Engineering, Jun. 2018, 247 pages.

International Search Report and Written Opinion in International Appln. No. PCT/US2024/042100, mailed on Nov. 25, 2024, 18 pages.

International Search Report and Written Opinion in International Appln. No. PCT/US2024/042123, mailed on Nov. 28, 2024, 16 pages.

International Search Report and Written Opinion in International Appln. No. PCT/US2024/054692, mailed on Feb. 10, 2025, 14 pages.

International Search Report and Written Opinion in International Appln. No. PCT/US2024/054686, mailed on Feb. 25, 2025, 13 pages.

* cited by examiner

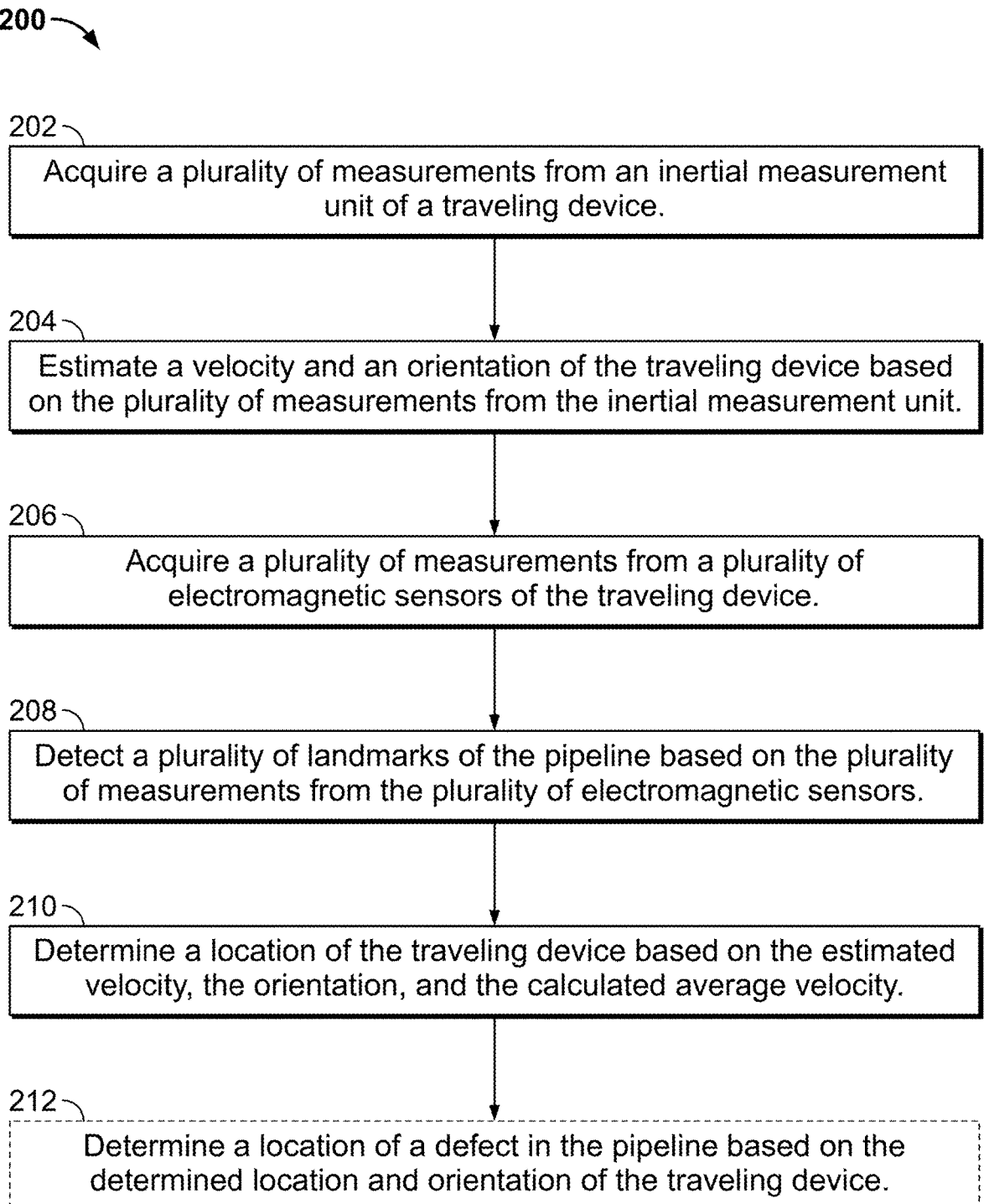

200

202

Acquire a plurality of measurements from an inertial measurement unit of a traveling device.

204

Estimate a velocity and an orientation of the traveling device based on the plurality of measurements from the inertial measurement unit.

206

Acquire a plurality of measurements from a plurality of electromagnetic sensors of the traveling device.

208

Detect a plurality of landmarks of the pipeline based on the plurality of measurements from the plurality of electromagnetic sensors.

210

Determine a location of the traveling device based on the estimated velocity, the orientation, and the calculated average velocity.

212

Determine a location of a defect in the pipeline based on the determined location and orientation of the traveling device.

304
Direction
of motion

Fluid medium
(e.g., air or water)

302
Object

Drag force
306

310

314

IMU-
Measurement $a_b, w_b$

316

Flow dynamics $a_f$

EKF $p, v, a_n$

312

554

540

556

112

Rx1
Rx2
Rx3
Rx4
Rx5
Rx6
Rx7
Rx8

Rx1
Rx2
Rx3
Rx8

L
t

553

552  112

550

540

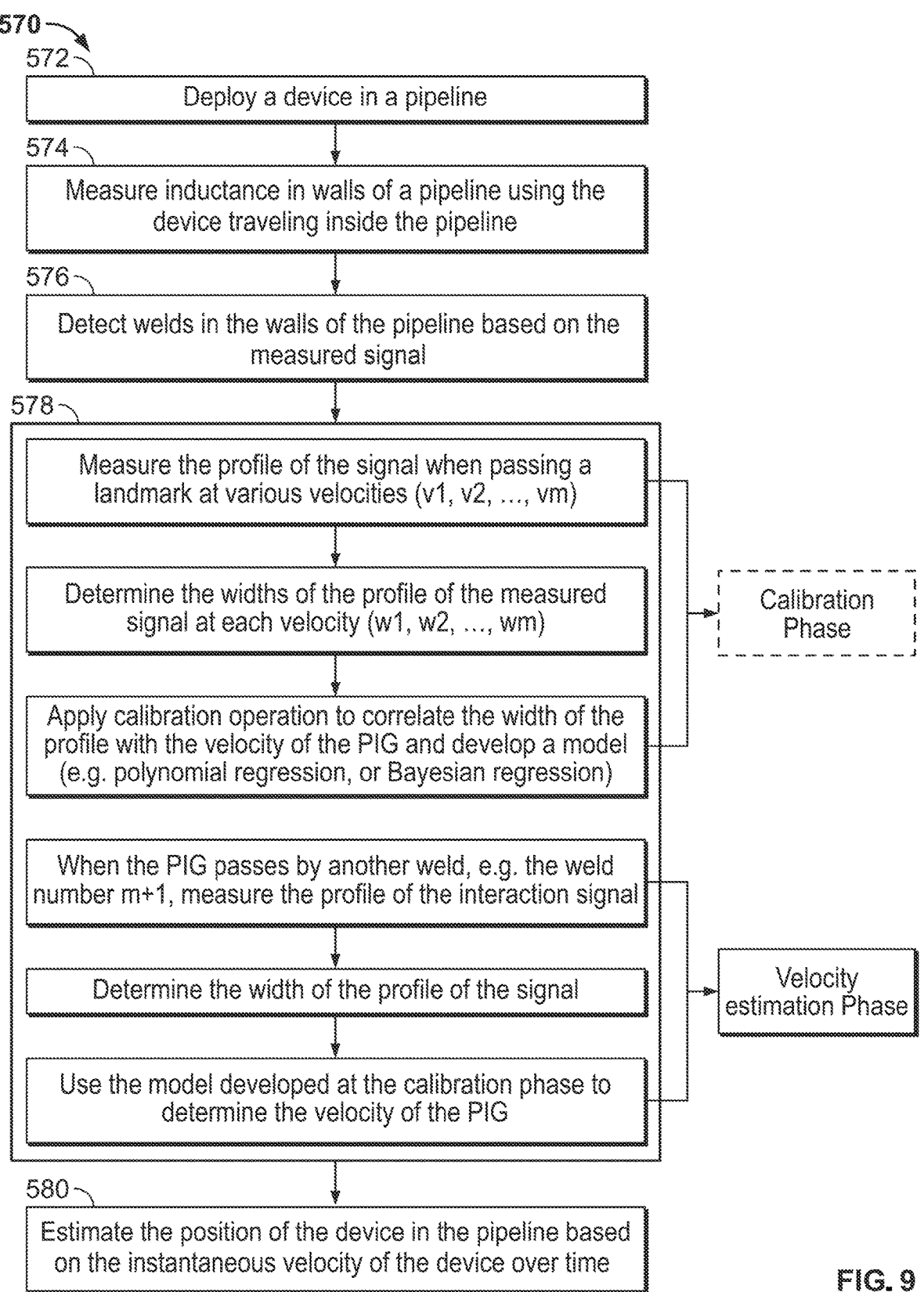

570

572

Deploy a device in a pipeline

574

Measure inductance in walls of a pipeline using the device traveling inside the pipeline

576

Detect welds in the walls of the pipeline based on the measured signal

578

Measure the profile of the signal when passing a landmark at various velocities (v1, v2, ..., vm)

Determine the widths of the profile of the measured signal at each velocity (w1, w2, ..., wm)

Apply calibration operation to correlate the width of the profile with the velocity of the PIG and develop a model (e.g. polynomial regression, or Bayesian regression)

Calibration Phase

When the PIG passes by another weld, e.g. the weld number m+1, measure the profile of the interaction signal Determine the width of the profile of the signal Use the model developed at the calibration phase to determine the velocity of the PIG Velocity estimation Phase

580

Estimate the position of the device in the pipeline based on the instantaneous velocity of the device over time

FIG. 9

IN-PIPE LOCALIZATION OF TOOLS USING SIGNAL PROFILES

TECHNICAL FIELD

The present disclosure generally relates to identifying the location of pipeline tools such as pipeline inspection gadgets and robots using time between signals.

BACKGROUND

Pipelines are important assets for transporting liquids or gases. Pipelines are exposed to harsh internal or external conditions that cause degradation in the quality of the pipelines leading to corrosion, wall loss, or even leakage. Therefore, pipelines are periodically inspected to assess the health of the pipeline and to detect possible signs of damages before they become more severe. The inspection of pipelines is usually carried out by a robot or a gadget that travels inside the pipelines with the objective of detecting signs of defects while traveling through the pipeline. These inspection practices are used in the oil and gas industry to assess the integrity of assets. An accurate localization of a traveling robot or gadget within the pipeline allows correct positioning of any identified defects.

SUMMARY

This specification describes systems and methods for monitoring, tracking, and determining the location of devices, such as, a pipeline inspection gadget (PIG) when traveling through a pipeline. The system uses electromagnetic sensors mounted on the traveling device (e.g., the PIG) to detect landmarks (e.g., welds) in a pipeline. The sensor data can be processed via artificial intelligence for increased accuracy in distinguishing the responses that correspond to in-pipe landmarks from the other responses.

In some approaches, the localization is achieved by recording the timestamp when a landmark is detected and using a known distance between landmarks to calculate an average velocity. The system also uses an onboard inertial measurement unit to estimate a velocity and traveled distance along the pipeline. A data processing system correlates the calculated average velocity from the landmark detection with the estimated average velocity from the inertial measurement unit to estimate the location of the traveling device and reduce error buildup in the estimated velocity and position based on the inertial measurement unit measurements.

In some approaches, systems and methods provide for estimating the instantaneous velocity of a PIG or other tool travelling inside a pipeline. These systems and methods can sense the changes in the recorded response when a weld is detected and, then, determine the instantaneous velocity of the moving PIG from the measured signals.

Some instantaneous velocity estimation systems use a single sensor array, to measure the instantaneous velocity of the travelling PIG. Specifically, the response of the sensors is recorded over time to create the profile of the interaction signal. This signal is measured with a distinguished signature whenever the PIG passes by a weld. The profile of the measured signal changes according to the speed of the travelling PIG, allowing for the estimation of the instantaneous velocity of the PIG. A calibration operation that correlates the width of the measured signal profile with the velocity of the PIG can be performed at the start of the process. This calibration process can be done modeling the width of the profile signal as a function of the velocity of the PIG.

EXAMPLES

In an example implementation, a system for estimating location of features in a pipeline includes: a device comprising a plurality of electromagnetic sensors, the device sized and shaped to be deployed and travel in the pipeline; at least one processor; and a memory storing instructions that when executed by the at least one processor cause the at least one processor to perform operations. The operations can include: acquiring measurements of signals from the plurality of electromagnetic sensors; detecting welds in walls of the pipeline based on the measurements of the signals; estimating an instantaneous velocity of the device as the device passes welds based at least in part on characteristics of the measurements of the signals from the plurality of electromagnetic sensors; and estimating position of the device in the pipeline based at least in part on the estimates of the instantaneous velocity of the device over time.

In an aspect combinable with the example implementation, detecting welds in walls of the pipeline based on the measurements of the signals comprises identifying peaks in the measurements of the signals.

In another aspect combinable with any of the previous aspects, the characteristics of the measurements of the signals from the plurality of electromagnetic sensors comprise widths of the identified peaks. In some cases, estimating an instantaneous velocity of the device as the device passes welds comprises comparing widths of the identified peaks to a model associating peak widths with velocities. In some cases, estimating position of the device in the pipeline based at least in part on the estimates of the instantaneous velocity comprises integrating the estimated instantaneous velocity over time.

In another aspect combinable with any of the previous aspects, the at least one processor and the memory storing instructions are components of the device.

In another aspect combinable with any of the previous aspects, the device is a pipeline inspection gadget.

In another aspect combinable with any of the previous aspects, the plurality of electromagnetic sensors are regularly distributed in a ring around a circumference of the device.

In another aspect combinable with any of the previous aspects, the system also includes an inertial measurement unit. In some cases, the inertial measurement unit comprises an accelerometer and a gyroscope.

In an example implementation, a method for estimating the location a traveling device in a pipeline includes: acquiring measurements of signals from a plurality of electromagnetic sensors on a device shaped to be deployed and travel in the pipeline; detecting welds in walls of the pipeline based on the measurements of the signals; estimating an instantaneous velocity of the device as the device passes welds based at least in part on characteristics of the measurements of the signals from the plurality of electromagnetic sensors; and estimating position of the device in the pipeline based at least in part on the estimates of the instantaneous velocity of the device over time.

In an aspect combinable with the example implementation, detecting welds in walls of the pipeline based on the measurements of the signals comprises identifying peaks in the measurements of the signals.

In another aspect combinable with any of the previous aspects, the characteristics of the measurements of the signals from the plurality of electromagnetic sensors include widths of the identified peaks. In some cases, estimating an instantaneous velocity of the device as the device passes welds comprises comparing widths of the identified peaks to a model associating peak widths with velocities. In some cases, estimating position of the device in the pipeline based at least in part on the estimates of the instantaneous velocity comprises integrating the estimated instantaneous velocity over time.

In another aspect combinable with any of the previous aspects, the at least one processor and the memory storing instructions are components of the device.

In another aspect combinable with any of the previous aspects the device is a pipeline inspection gadget.

In another aspect combinable with any of the previous aspects, the plurality of electromagnetic sensors are regularly distributed in a ring around a circumference of the device.

In another aspect combinable with any of the previous aspects, the device also includes an inertial measurement unit. In some cases, the inertial measurement unit comprises an accelerometer and a gyroscope.

Advantages

The methods and systems described in this specification enable one or more of the following technical advantages. This system and method are independent of the requirement for installing external sensors and associated supporting infrastructure outside of the pipeline, reducing the cost to maintain and operate this system. This system and method have a contactless interaction with the pipe by using electromagnetic sensors. The landmark detection provides an independent reference of the velocity of the traveling device, improving localization accuracy by reducing error buildup that occurs when using an inertial measurement unit alone.

The systems and methods described in this specification can use artificial intelligence combined with advanced electromagnetic sensors to detect joint welds as landmarks. This approach can provide more accurate solution and localization than systems that use pressure sensors to detect obtrusions, which are considered as landmarks. The systems and methods described in this specification avoid the false positives associated with obtrusions caused by other external sources and the false negatives associated with obtrusions that are worn out. Since the welds electric and magnetic properties are different from the pipe properties, these systems and methods have a lower likelihood of false negatives than systems based on the detection of obtrusions.

The systems and methods described in this specification provide contactless solution that depend on detecting welds via on-board electromagnetic sensors. This allows for higher accuracy than solutions that require maintaining a contact with the wall of a pipeline. This can provide a more accurate instantaneous velocity estimation.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

FIG. 2 is a flow chart of a method for localizing a traveling device within a pipeline.

FIG. 9 is a flow chart of a method of estimating a velocity of a device traveling in a pipeline.

Like reference symbols in the various drawings indicate like elements.

DETAILED DESCRIPTION

Figure 1A:
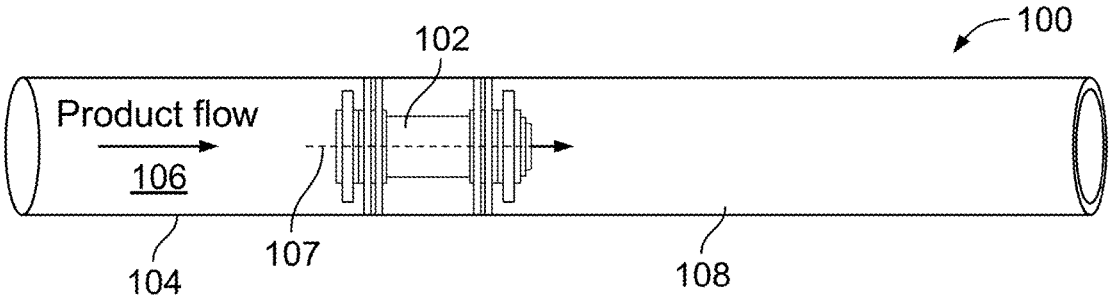
FIG. 1A is an illustration of a PIG in pipeline.

This specification describes systems and methods for monitoring, tracking, and determining the location of devices such as robots and pipeline inspection gadgets (PIG) traveling through a pipeline. The traveling device includes electromagnetic sensors to detect landmarks that are regularly positioned within the pipeline, for example, welds. These welds are present as a result of joining pairs of pipe segments, also known as spools, which are of a standard length that is readily known. The traveling device and an associated data processing system record a timestamp whenever a weld is detected.

In some approaches, the average velocity and traveled distance of the moving device is determined from two consecutive landmark detections. Additionally, the traveling device includes an onboard inertial measurement unit, which in some embodiments includes an accelerometer and a gyroscope to measure acceleration and angular velocity of the traveling device. The data processing system combines the estimated average velocity and traveled distance obtained from the detection of landmarks with the readings obtained from the inertial measurement unit to determine the location of the traveling device inside the pipeline using an extended Kalman filter and Rauch—Tung—Striebel smoother.

In some approaches, systems and methods provide for estimating the instantaneous velocity of a PIG or other tool travelling inside a pipeline. These systems and methods can sense the changes in the recorded response when a weld is detected and, then, determine the instantaneous velocity of the moving PIG from the measured signals. Although some examples are discussed with respect to sensors measuring, for example, inductance or their relative and/or mutual values, other electromagnetic based signals (e.g., current, voltage, resistance, capacitance, flux, potential, etc. or other derivatives, or alternatively those generated by sensors measuring acoustic, or other electromagnetic and/or any other electromagnetic-acoustic coupled responses) can also be used.

In some approaches, systems and methods provide for estimating the instantaneous velocity of a PIG or other tool travelling inside a pipeline. These systems and methods can sense the changes in the recorded response when a weld is detected and, then, determine the instantaneous velocity of the moving PIG from the measured signals.

The systems and methods of this specification enable the localization of PIGs, robots, or other targets (e.g., humans) traveling through pipelines in global positioning system (GPS) denied environments, for example, pipelines deeply buried underground. These systems provide a self-reliant in-pipe localization via detection of welds that connect pipeline segments or other regularly occurring landmarks in the pipeline; combined with an inertial navigation system (INS) based on inertial measurement unit measurements for accurate localization and without the need to confer with any external-to-the-pipeline devices or landmarks. These systems and methods provide higher accuracy, and lower computational complexity and hardware cost when compared to other existing systems that require both in-pipe and out-of-pipe interaction dependency for an accurate localization. These systems and methods are attachable to and/or integrate-able with standard PIGs, robots, or other inspection tools.

FIG. 1A shows a diagram 100 of a PIG 102 within a pipeline 104. The product flow 106 in the pipeline moves the PIG 102 along a longitudinal axis 107 of the pipeline. Example products that flow in the pipeline include crude oil, petroleum products, and water. As the PIG 102 moves through the pipeline, the PIG detects deposits 108 that have built up overtime within the pipeline 104. The PIG 102 can also detect other surface defects of the pipeline 104 that can indicate corrosion or wall loss.

Figure 1B:
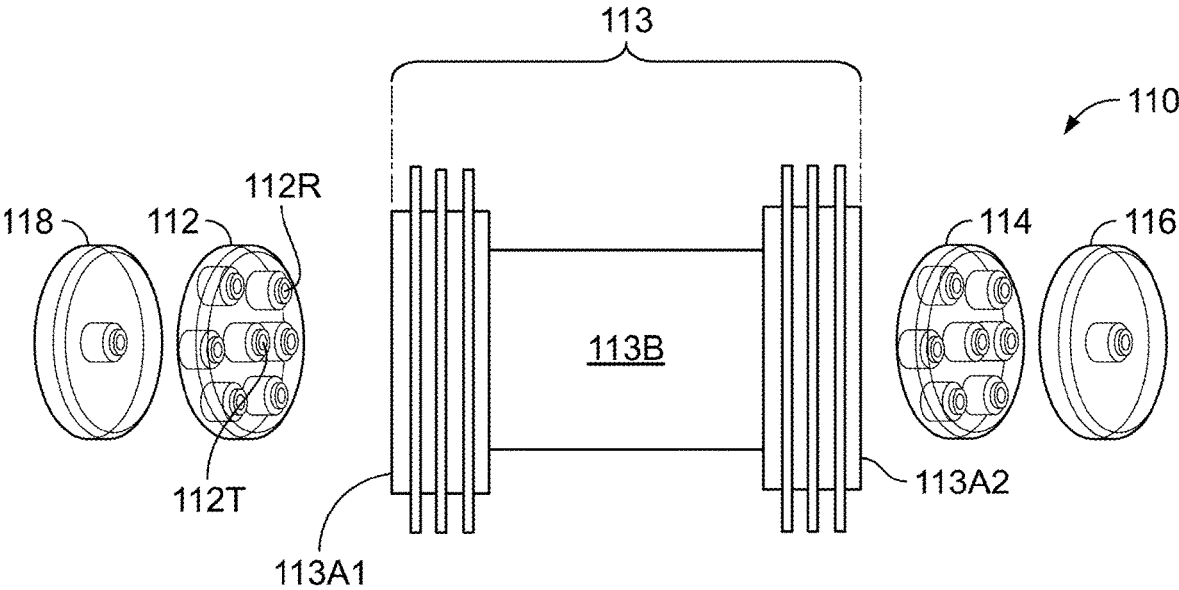
FIG. 1B is a schematic of a PIG.

FIG. 1B shows a diagram 110 illustrating an example PIG 113. The PIG 113 includes systems to detect defects in walls of the pipe and to identify the location of the PIG. The PIG 113 includes capsules 112, 114, 116, and 118 positioned at the front and/or back of its body. The PIG 113 includes an inertial measurement unit inside the body 113B. The inertial measurement unit includes sensors such as accelerometers and gyroscopes to measure the acceleration and angular velocity of the PIG 113. As illustrated, capsules 112 and 114 incorporate a combination of electromagnetic (EM) transmitters (e.g., 112T) and receivers (e.g., 112R) while capsules 116 and 118 incorporate a transmitter only. These capsules equipped with EM transmitters and/or receivers are designed to be attached to the body of the PIG 113 as the PIG is carried through the pipeline 104. The capsules can be retrofitted to a standard PIG. The transmitters and receivers for detecting all defects are located at the front and/or the back end of the PIG and are configured with the sensors distributed to cover a 360 degree field of view. These sensors can also be used to detect welds in the pipe as input to the location determination approach described with reference to FIG. 2.

In one illustration, the transmitter, responsible for emitting the initial electromagnetic signal for inspection of the target pipeline, is configured to operate at a frequency selected to interact with the material composition of the target pipeline to inspect the integrity of the pipe wall. In some cases, the material composition includes carbon steel, for example API 5L X60. The receivers, responsible for collecting the transmitted signal after its interaction with the wall of the target pipeline, are configured to couple to this transmitted signal interacting with the wall in a manner that decouples and distinguishes defective segments of the pipe and/or welds in the pipe.

In some implementations, capsules 112, 114, and 116 are mounted at the front end or the back end of a PIG. For example, capsules 112, 114, 116, and 118 are coaxially mounted with respect to the PIG. As illustrated, the transmitter (e.g., 112T) is mounted towards the center of the capsule, which emits EM signals in the form of, for example, pulsed waveforms, or almost continuous wave (CW). The transmitter can be configured as a coiled antenna, a dipole antenna, or a combination thereof. The radiation pattern of the transmitter can be omni-directional in the circumferential aspect so that the cross-section of the pipe that is co-planar with the capsule receives relatively uniform EM radiation.

The receivers (e.g., 112R) are positioned on the circumference of the capsule to be in close proximity to, but without contacting, the inner surface of the pipe. In some cases, the receivers are evenly distributed around the circumference of the capsule. The receivers may be stationary relative to the PIG and spaced at equal distances from the transmitter. The receivers may be tuned to encompass a larger bandwidth than the transmitter. The receivers are configured to receive EM signals in response to radiated EM signals from the transmitter in the surrounding of the inner wall of the pipe for detection of welds within the pipe. In some implementations, the sensors serve a dual purpose, detection of welds and assessment of the integrity of the wall, where losses in the inner and outer surfaces as well as full wall-losses, can significantly affect the reception. Some implementations assess situations varying from inner and outer surface losses (e.g., erosion) to full wall-losses (e.g., total loss).

Data collected and recorded by the traveling device (e.g., PIG) can be processed by a data processing system onboard the traveling device. Alternatively, the data can be stored in a memory on the traveling device and accessed by a data processing system after the traveling device has been recovered from the pipeline. In some implementations, the data may be transmitted to another device while the traveling device is traveling through the pipeline. For example, the data may be transmitted to a second device that is tracking the traveling device (e.g., an accompanying vehicle such as a crawler, robot, or drone). The data processing system may reside on the second device.

Localization of an in-pipe PIG (e.g., 102) is a challenging task, particularly in buried pipelines. In buried pipelines, there is no GPS signal connectivity, such pipelines are sometimes designated as GPS denied territories. A localization system in buried pipelines cannot rely on the use of GPS navigation systems. In addition, it is not practical to dig underground to install external sensors around a pipeline. It is advantageous that localization systems of PIGs/robots traveling through pipelines rely on self-contained sensors. For example, self-contained sensors such as accelerometers can be integrated, attached to, or placed on-board a device without the need for external references to correctly operate them.

FIG. 2 shows a flow chart of an example method 200 for localizing a traveling device in a pipeline. A processor acquires a plurality of measurements from an inertial measurement unit and stores the plurality of measurements in a data store (step 202). The inertial measurement unit is a self-contained sensor installed onboard the traveling device. In some implementations, the inertial measurement unit includes an accelerometer and a gyroscope to measure acceleration and angular velocity of the traveling device.

The data processing system estimates a velocity and an orientation of the traveling device based on the plurality of measurements from the inertial measurement unit (step 204). In some implementations, a data processing system numerically integrates a measured angular velocity $\omega_b$ to determine an orientation of the traveling device or PIG. The data processing system determines the attitude of the PIG based on the determined orientation. The data processing system also transforms an acceleration ah measured in a body frame of reference of the traveling device into a global navigation frame. The transformation is based on the determined orientation. The data processing system numerically integrates the measured acceleration, expressed in the navigation frame, to determine a velocity of the PIG. The data processing system also numerically integrates the velocity to determine a position of the PIG within the pipeline. Due to the numerical integration, positioning errors can accumulate and grow quickly with time. To reduce this source of localization errors, in some implementations, the data processing system accounts for the motion dynamics of the PIG inside the pipeline.

Figure 3A:
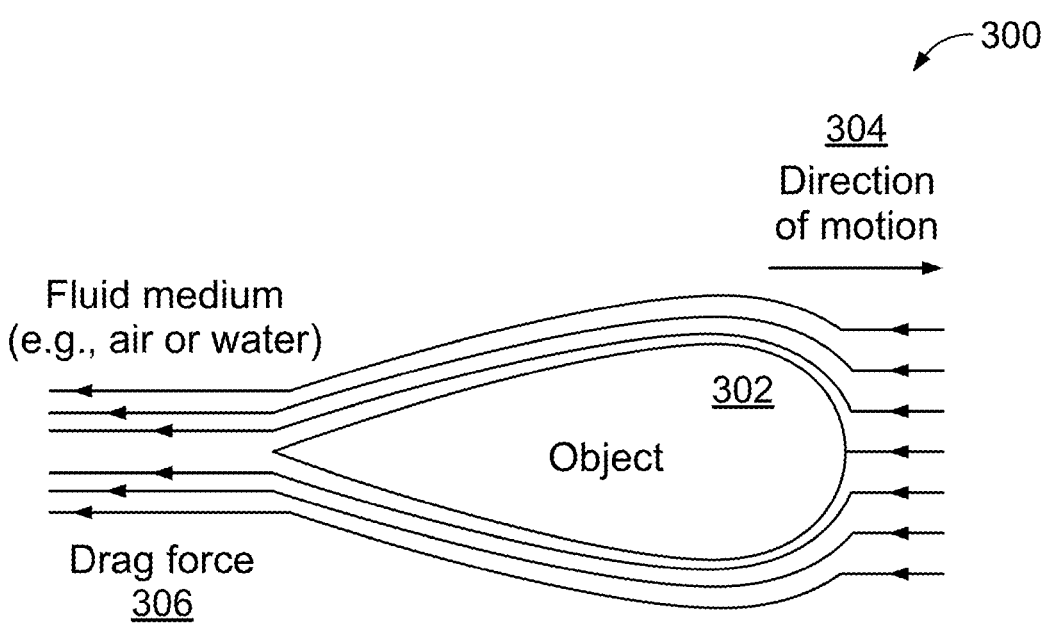
FIG. 3A is an illustration of drag force acting on a PIG.

FIG. 3A shows an illustration 300 of example forces acting on a pipeline inspection gadget. The PIG is a passive device that is propelled by the flow of product traveling through pipes. In the illustration 300, the PIG is represented by a streamlined body 302 immersed in a fluid medium (e.g., air, water, oil). In the direction of motion 304 of the PIG, the dominant force acting on the PIG is a drag force 306. The PIG also experiences a friction force. The magnitude of the friction force is negligible in comparison with the magnitude of the drag force 306. The drag force 306 can be used to express the PIG's acceleration in terms of its velocity and the product's flow velocity. For example, $$a_f = \frac{C_D \rho (V_f - V_b)^2 A}{2(m_b + m_a)},$$

where $a_f$ is the acceleration of the PIG, $V_f$ is the flow velocity of the product in the pipeline, $V_b$ is the velocity of the PIG, A is a reference area, $C_D$ is a coefficient of drag based on the shape of the PIG, $m_b$ is the mass of the PIG, $m_a$ is the added mass, and $\rho$ is the density of the fluid in the pipeline.

Figure 3B:
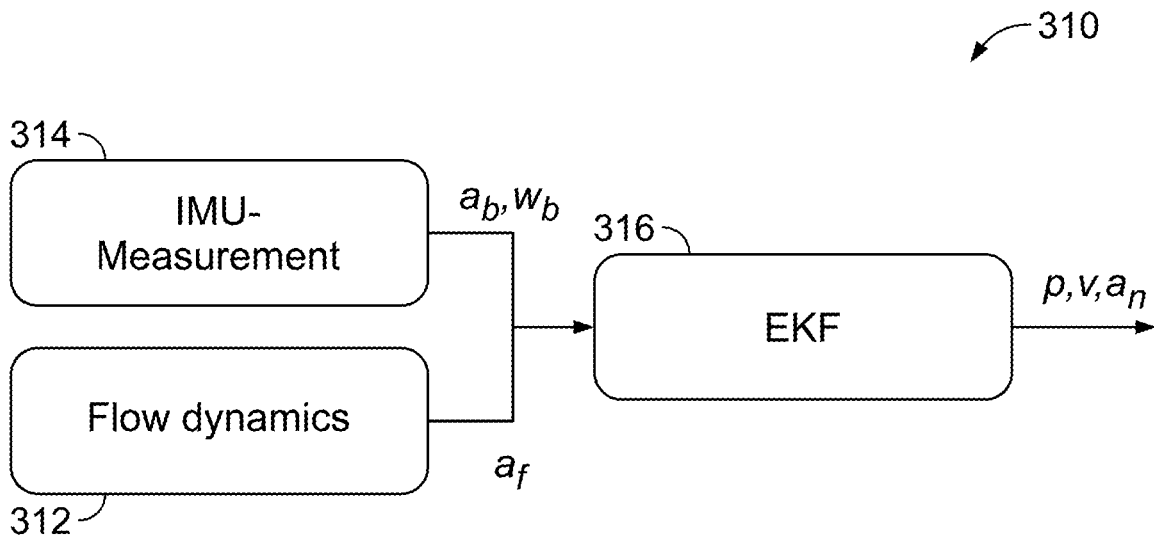
FIG. 3B is a flow chart of a method of estimating a velocity of a device traveling in a pipeline.

FIG. 3B shows a flow chart of an example method 310 of estimating the acceleration of a traveling device. In some implementations, the data processing system estimates the PIG's acceleration based on the motion dynamics of the PIG in the pipeline (step 312), and the data processing system acquires measurements of the PIG's acceleration from an accelerometer in an inertial measurement unit onboard the PIG (step 314). The data processing system combines the estimated acceleration and the measured acceleration using an extended Kalman filter (EKF) to obtain a better estimate of the acceleration of the PIG (step 316). The output of the EKF includes an estimated position p, an estimated velocity v, and an estimated acceleration an of the traveling PIG in the global navigational frame of reference.

Referring to FIG. 2 and the method 200, the data processing system acquires a plurality of measurements from a plurality of electromagnetic sensors on the traveling device or PIG (step 206). In some implementations, the plurality of measurements includes a time-series of induced signature for electromagnetic sensors.

Figures 4A, 4B, 5:
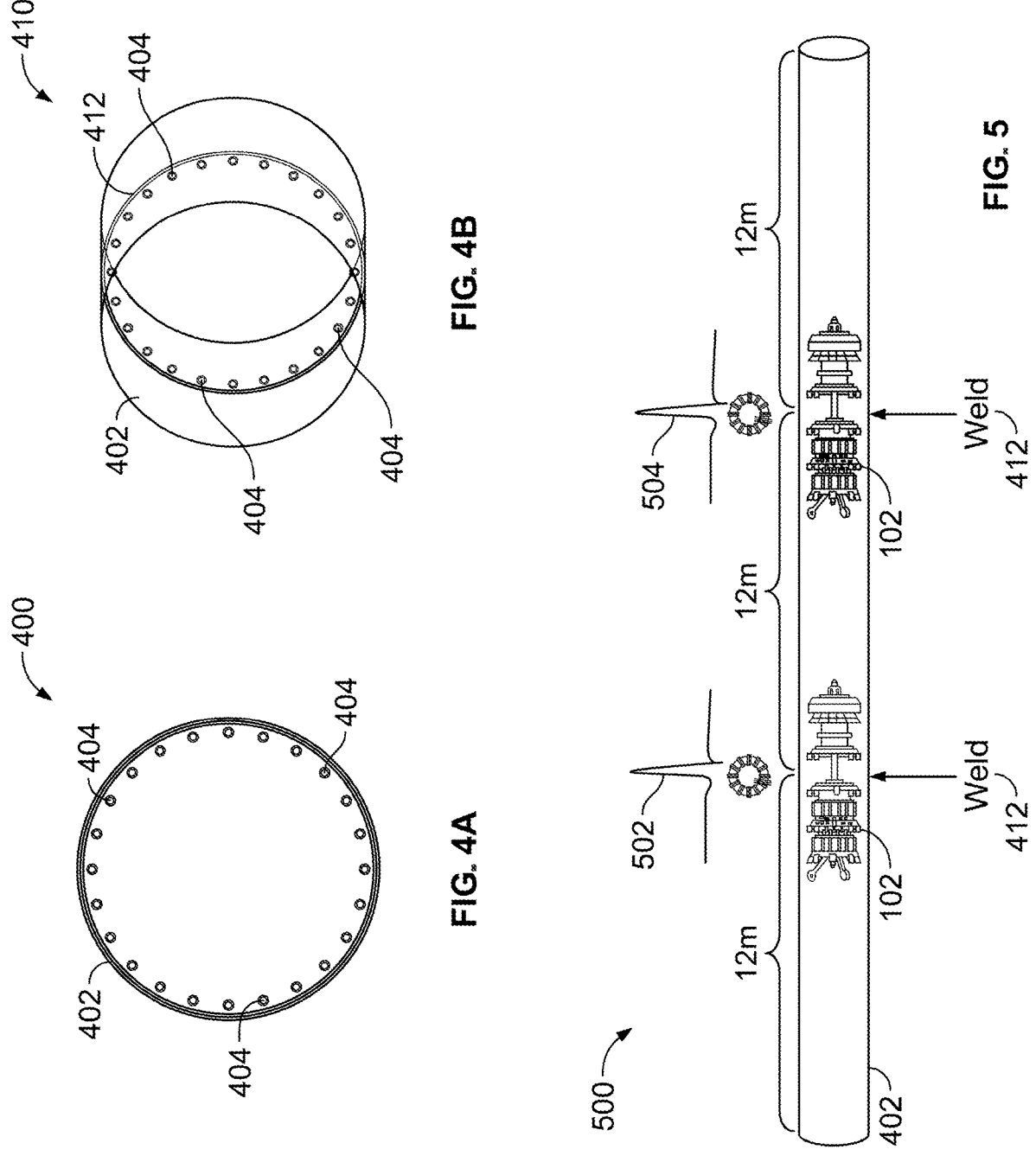
FIG. 4A-4B are views of a distribution of electromagnetic sensors with respect to a pipeline.
FIG. 5 is an illustration depicting a series of landmark detections within a pipeline.

FIG. 4A-4B show a schematic of an example distribution of electromagnetic sensors with respect to a pipeline. FIG. 4A shows a cross-section view 400 of pipe 402 with a plurality of electromagnetic sensors 404 regularly distributed about an inside perimeter of the pipe 402 in a ring shape. The diameter of the ring shape is smaller than a diameter of the pipe 402 such that the ring of electromagnetic sensors fit within the pipe. The structure supporting the sensors is not shown in the cross-section view 400. FIG. 4B shows a second view 410 of the electromagnetic sensors 404 within the pipe 402. In the second view 410, the electromagnetic sensors are shown encountering a weld 412 around the circumference of the pipe 402.

Pipelines carrying product are composed of pipe segments that are manufactured with standard lengths and shapes. These standard pipe segments are joined using welds. The electromagnetic-based sensors onboard the traveling device interact with the pipe and a processor records the response data. Regularly spaced landmarks in the pipeline such as welds at joints between pipe segments can be detected by the electromagnetic sensors since the electric and magnetic properties of the weld are different than the electric and magnetic properties of the pipe. When the PIG passes by a weld, there is a detectable change in the measured signal across a plurality of the electromagnetic sensors. By detecting this change in the measured signal, the welds are recognized. The data processing system also records the time stamps at which a PIG passes by each weld. The electromagnetic sensors serve a dual purpose, general inspection, and diagnostics of the pipeline, and detecting weld joints in the pipelines.

The data processing system detects a plurality of landmarks of the pipeline based on the plurality of measurements acquired from the plurality of electromagnetic sensors (step 208). In some implementations, the data processing system uses an artificial intelligence (AI) model to detect landmarks in the pipeline (e.g., welds) based on the plurality of measurements acquired from the plurality of electromagnetic sensors. The artificial intelligence model can be for example a neural network or a recurrent neural network. The artificial intelligence model is trained on data of the electromagnetic sensors. The AI model can also be trained using measurements acquired from a PIG traveling through a pipeline that have been manually labeled to identify landmarks. Data extracted from the electromagnetic sensors and correctly labeled by the AI model can also be used to further update and train the AI model. The inputs to the AI model are the measured time-series signals from the plurality of electromagnetic sensors. The outputs of the AI model are timestamps of detected landmarks. The AI model increases accuracy and reliability in distinguishing responses that correspond to the in-pipe landmarks from the other responses as compared with detections by other techniques, such as a cross-correlation technique.

FIG. 5 is an illustration 500 of a series of example landmark detections 502 and 504 within a pipeline 402. Since pipeline 402 has segments with a known standard length, and the time stamps corresponding with the traveling device passing each weld are recorded, the data processing system estimates an average flow velocity by dividing the length of a pipe segment by the difference between two consecutive time stamps. A PIG 102 encounters a weld 412 at a first time $t_1$. The plurality of electromagnetic sensors of the PIG sense a distinguished signal response, for example a spike. The data processing system identifies the signal in the measurements as a landmark 502. At a second time 12, the PIG 102 encounters another weld 412 at the next junction of two pipe segments. Again, the data processing system detects a unique signal in the measurements by the plurality of electromagnetic sensors and identifies the signal as a landmark 504. The data processing system calculates an average velocity of the PIG as it traveled from the first weld to the second weld based on the known times $t_1$ and $t_2$ and based on the known length of the standard pipe segment $L_p$. The velocity is calculated as $V_r=L_p/(t_2-t_1)$.

The data processing system calculates an average velocity of the traveling device based on the detected plurality of landmarks of the pipeline (step 210). In some implementations, the data processing system calculates an average velocity between each pair of detected landmarks.

The data processing system determines a location and an orientation of the traveling device in the pipeline by combining the estimated velocity and estimated orientation based on the inertial measurement unit measurements with the calculated average velocity based on the landmark detections (step 210). In some implementations, the inertial measurement unit has a fixed update rate, and the weld detection algorithm has a varying update rate that depends on the velocity of the traveling device, (e.g., PIG/robot). In some implementations, the data processing system combines the estimated velocity from the inertial measurement unit and the calculated velocity from the weld detection technique using a Rauch-Tung-Striebel (RTS) smoother algorithm with an extended Kalman filter (EKF).

In some implementations, the data processing system determines a location of a defect in the pipeline based on the determined location and orientation of the traveling device (step 212).

In some implementations, these systems and methods localize a device, such as a PIG, that is traveling through a pipeline by means of detecting welds that join the pipeline segments. The method utilizes a set of advanced electromagnetic sensing techniques combined with AI to detect the welds. An inertial measurement unit is used to obtain the acceleration and the angular velocity of the moving device (e.g., PIG). The device (e.g., PIG) is equipped with a ring of electromagnetic sensors and an inertial measurement unit that includes an accelerometer and a gyroscope. An inertial navigation system (INS) estimates the position and velocity of the device, PIG, via the inertial measurement unit measurements. An extended Kalman filter (EKF) combines the INS estimates with the motion dynamics to improve the localization accuracy. An EKF is combined with a Rauch-Tung-Striebel (RTS) smoother to further improve the localization accuracy via using the weld detection mechanism.

The systems and methods of this specification have advantages over other methods of mitigating error buildup based on measurements form an inertial measurement unit. The method 200 is contactless and only depends on detecting welds via on-board electromagnetic sensors. This allows for higher accuracy as the solution does not require maintaining a contact with the wall of a pipeline reducing scratches that may be caused by for example a wheel encoder.

Figures 6, 7:
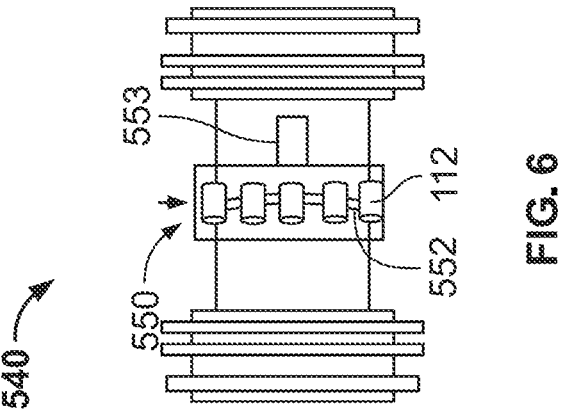
FIG. 6 is a schematic of a PIG with a single ring of sensors.
FIG. 7 illustrates the electromagnetic signatures generated as the PIG of FIG. 6 passes a weld.

FIG. 6 is a schematic of a PIG 540. The PIG 540 is generally similar to the PIG 113 but incorporates a system 550 with a single ring of sensors (e.g., capsule 112 described with reference to FIG. 1B) with at least one processor 552 and associated memory operable to execute a weld detection algorithm. Although described with reference to a PIG, this approach can also be applied to measure the velocity of other tools and robots traveling through a pipeline. Although the system 550 includes an inertial measurement unit 553 (e.g., an inertial measurement unit with an accelerometer and a gyroscope), some implementations do not include an inertial measurement unit.

The weld detection algorithm relies on sensing where the electromagnetic coupling between a sensor coil and the wall of the pipe is measured. For example, the sensor coil induces electromagnetic field, where some of the transmitted electromagnetic energy gets transferred to the metallic objects within the view of the incident field. An induced current flows through the metallic objects causing a secondary electromagnetic field. This leads to changes in the effective signal of the sensor coil that can be easily measured. The amount of signal change depends on the composition of the metallic material. For example, welds are composed from different materials to the otherwise homogeneous body of the pipeline will cause a noticeable change in the signal, which can be detected.

FIG. 7 illustrates the electromagnetic signatures generated as the PIG 540 of FIG. 6 passes a weld 554. To avoid false positives in which other anomalies (e.g., corrosion and wall-losses) are classified as welds, the system 550 uses a circular array of sensors circumferentially spread to cover the full 360 degrees field of view. As the sensors array passes the weld 554, the weld material that manifest different material properties to the background pipeline and is also circumferentially spread in the cross-sectional area of the pipe will cause induced change in all sensors of the array at the same time instant. By correlating the induced change in these sensors, welds can be accurately detected and uniquely distinguished from other features.

The system 550 determines the PIG's instantaneous velocity as it passes a weld. The single array of sensors 112 is used to detect changes in a measured signal over time. As the PIG 540 passes the weld 554, there is a detectable change in the measured signal 556 across the full array of sensors. By detecting this universal change in the measured signal across a set of sensors, the welds are uniquely recognized. The changes in the measured induced signal are recorded over time as the PIG 540 passes by welds.

Figure 8B:
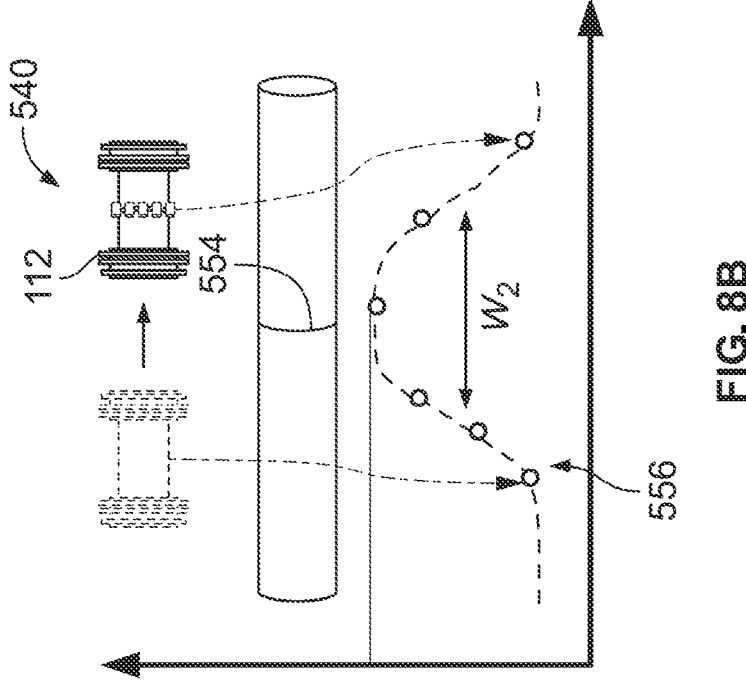
FIGS. 8A and 8B illustrate the impact of different velocities on the electromagnetic signatures generated as the PIG of FIG. 6 passes a weld.
Figure 8A:
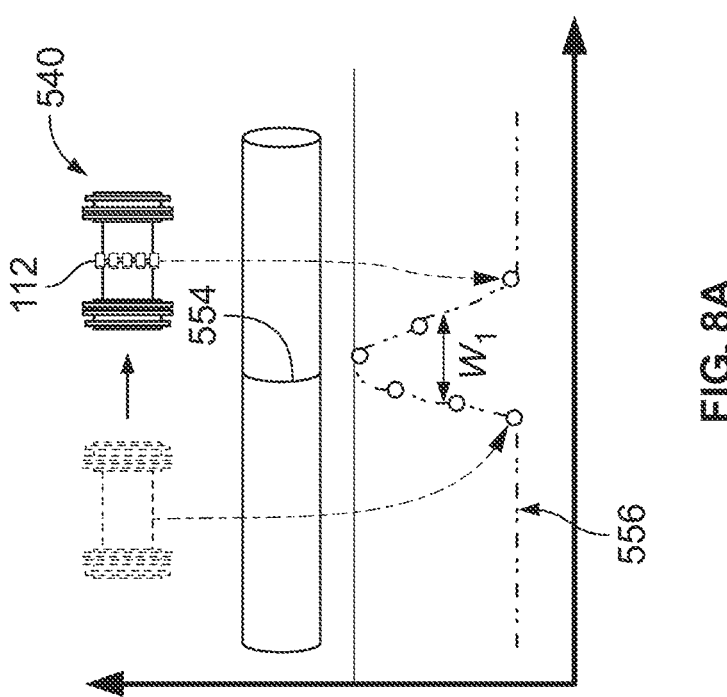

FIGS. 8A and 8B illustrate the impact of different velocities on the electromagnetic signatures generated as the PIG 540 of FIG. 6 passes a weld 554. These figures illustrate the movement of the PIG 540 through a pipeline and the associated measured signal 616. The PIG 540 in FIG. 8A is traveling more slowly than the PIG 540 in FIG. 8B.

The measured signal changes over time according to the speed of the travelling PIG. The profile of the measured signal over time has a peak whenever a weld is detected. The width of this peak vis a function of the velocity of the travelling PIG 540. Specifically, the width of the peak decreases with increases in the PIG's velocity and the velocity of the PIG 540 can be estimated based on the width of the peak in the profile of the measured signal.

FIG. 9 is a flow chart of a method 570 of estimating a velocity of a device (e.g., one of the previously described PIGs) traveling in a pipeline. The device is deployed in pipeline (step 572). As the device travels through the pipeline, measurements of signal from the plurality of electromagnetic sensors are acquired by the device (step 574).

Welds in walls of the pipeline are detected based on the measurements of a signal (step 576). Detecting welds in walls of the pipeline includes identifying peaks in the measurements of the signal. Based at least in part on characteristics of the measurements of the signal from the plurality of electromagnetic sensors as the device passes welds, an instantaneous velocity of the device is estimated (step 578). The characteristics of the measurements of the signal from the plurality of electromagnetic sensors can include widths of the identified peaks. Estimating an instantaneous velocity of the device as the device passes welds comprises can include comparing widths of the identified peaks to a pre-calibrated model. For example, the model could be developed based on profiles measured as the sensors pass a weld at known velocities.

Based at least in part on the estimates of the instantaneous velocity of the device over time, the position of the device in the pipeline is estimated (step 580). Estimating the position of the device in the pipeline based at least in part on the estimates of the instantaneous velocity can include integrating the estimated instantaneous velocity over time. Estimates of the position of the device also provides estimates of the location of defects in the pipeline observed by the device The approach described with reference to FIGS. 6-9 provides high accuracy instantaneous velocity estimation of the travelling PIG. These high accuracy instantaneous velocity estimations can support an update rate of the localization high enough to get the motion trajectory of the travelling PIG. By using EM sensors with high update rate (e.g., more than 10 kHz,) to capture the variation in the profile of the measured signal against the variation of the instantaneous velocity, this approach can be implemented with the single array of sensors described with reference to FIGS. 6-8B.

Figure 10:
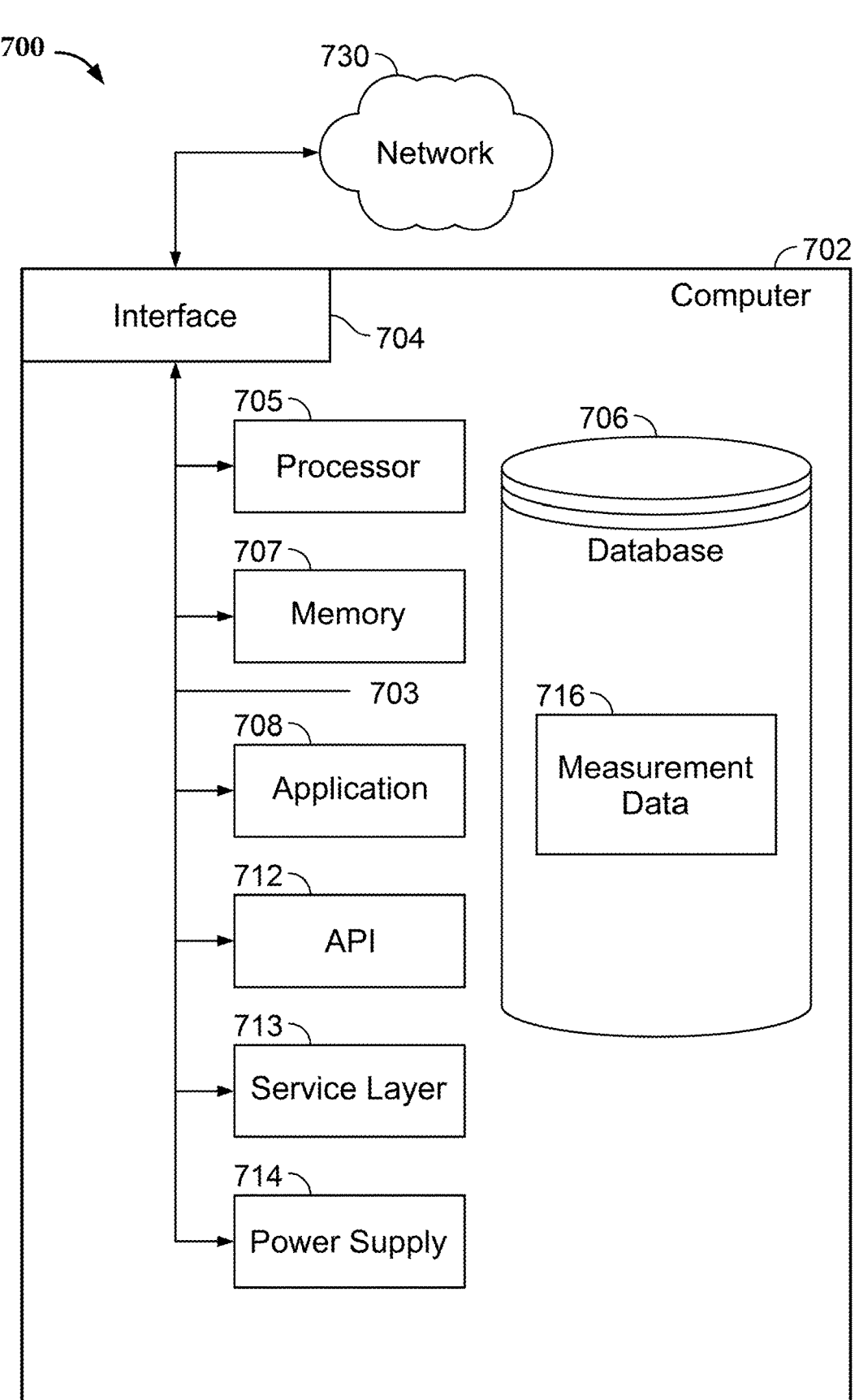
FIG. 10 is a block diagram illustrating a computer system used to provide computational functionalities associated with described algorithms, methods, functions, processes, flows, and procedures as described in the present disclosure, according to some implementations of the present disclosure.

FIG. 10 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 10, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the hardware of the interface can be operable to communicate physical signals within and outside of the illustrated computer 702.

The computer 702 includes a processor 705. Although illustrated as a single processor 705 in FIG. 10, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data (for example, measurement data 716) for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 10, two or more databases (of the same, different, or combination of types)

can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 10, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or nonrechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the scope of this disclosure. Accordingly, other embodiments are within the scope of the following claims.

What is claimed is:

1. A system for estimating location of features in a pipeline, the system comprising:
    a device comprising a plurality of electromagnetic sensors, the device sized and shaped to be deployed and travel in the pipeline;
    at least one processor; and
    a memory storing instructions that when executed by the at least one processor cause the at least one processor to perform operations comprising:
        acquiring measurements of signals from the plurality of electromagnetic sensors;
            detecting welds in walls of the pipeline based on the measurements of the signals by identifying peaks in the measurements of the signals;
            estimating an instantaneous velocity of the device as the device passes welds based at least in part on characteristics of the measurements of the signals from the plurality of electromagnetic sensors comprising widths of the peaks, wherein estimating the instantaneous velocity of the device as the device passes welds comprises comparing widths of the peaks to a model associating the widths of the peaks with velocities of the plurality of electromagnetic sensors; and
            estimating position of the device in the pipeline based at least in part on the instantaneous velocity of the device over time.

2. The system of claim 1, wherein the device travels in the pipeline being immersed in a fluid.

3. The system of claim 2, wherein the device is a passive device that is propelled by a flow of the fluid traveling through the pipeline.

4. The system of claim 3, wherein estimating position of the device in the pipeline based at least in part on the estimates of the instantaneous velocity comprises integrating the estimated instantaneous velocity over time.

5. The system of claim 1, wherein the at least one processor and the memory storing instructions are components of the device.

6. The system of claim 1, wherein the device is a pipeline inspection gadget.

7. The system of claim 1, wherein the plurality of electromagnetic sensors are distributed in a ring around a circumference of the device.

8. The system of claim 1, further comprising an inertial measurement unit.

9. The system of claim 8, wherein the inertial measurement unit comprises an accelerometer and a gyroscope.

10. A method for localizing a traveling device in a pipeline, the traveling device comprising a plurality of electromagnetic sensors, the method comprising:
    acquiring measurements of signals from a plurality of electromagnetic sensors on a device shaped to be deployed and travel in the pipeline;
    detecting welds in walls of the pipeline based on the measurements of the signals by identifying peaks in the measurements of the signals;
    estimating an instantaneous velocity of the device as the device passes welds based at least in part on characteristics of the measurements of the signals from the plurality of electromagnetic sensors comprising widths of the peaks, wherein estimating the instantaneous velocity of the device as the device passes welds comprises comparing widths of the peaks to a model associating the widths of the peaks with velocities of the plurality of electromagnetic sensors; and
    estimating position of the device in the pipeline based at least in part on the instantaneous velocity of the device over time.

11. The method of claim 10, wherein the device travels in the pipeline being immersed in a fluid.

12. The method of claim 11, wherein the device is a passive device that is propelled by a flow of the fluid traveling through the pipeline.

13. The method of claim 12, wherein estimating position of the device in the pipeline based at least in part on the estimates of the instantaneous velocity comprises integrating the estimated instantaneous velocity over time.

14. The method of claim 10, wherein the at least one processor and the memory storing instructions are components of the device.

15. The method of claim 10, wherein the device is a pipeline inspection gadget.

16. The method of claim 10, wherein the plurality of electromagnetic sensors are distributed in a ring around a circumference of the device.

17. The method of claim 10, the device further comprises an inertial measurement unit.

18. The method of claim 17, wherein the inertial measurement unit comprises an accelerometer and a gyroscope.

\* \* \* \* \*